United States Patent [19]

Sartorio

[11] Patent Number: 5,042,287
[45] Date of Patent: Aug. 27, 1991

[54] MANIPULATOR DEVICE FOR A BENDING MACHINE AND A METHOD FOR CHANGING THE POSITION OF THE WORKPIECE IN A BENDING PROCESS

[75] Inventor: Franco Sartorio, Turin, Italy

[73] Assignee: Amada Company, Limited, Japan

[21] Appl. No.: 323,893

[22] Filed: Mar. 15, 1989

[30] Foreign Application Priority Data

Mar. 15, 1988 [IT] Italy ................ 67224 A/88

[51] Int. Cl.⁵ .................. B21D 43/11; B25J 15/08; B25J 18/04; B65H 5/12
[52] U.S. Cl. ..................... 72/422; 414/431; 414/759; 414/763; 414/772; 414/783; 414/590
[58] Field of Search ............ 72/420, 422, 389.31; 414/589, 590, 738, 739, 751, 431, 758, 759, 761, 763, 772, 774, 776, 783

[56] References Cited

U.S. PATENT DOCUMENTS

| 4,042,122 | 8/1977 | Espy et al. | 414/783 |
| 4,557,135 | 12/1985 | Ragettli | 72/420 |
| 4,658,663 | 8/1987 | Jorgensen | 269/244 |
| 4,708,573 | 11/1987 | Hug | 72/420 |
| 4,735,079 | 4/1988 | Sartorio | 72/422 |
| 4,827,757 | 5/1989 | Sartorio | 72/420 |
| 4,842,473 | 6/1989 | Zbornik | 414/758 |

FOREIGN PATENT DOCUMENTS

| 904504 | 3/1986 | Belgium . | |
| 83559 | 7/1983 | European Pat. Off. . | |
| 110655 | 6/1984 | European Pat. Off. . | |
| 115602 | 6/1984 | European Pat. Off. . | |
| 136598 | 9/1984 | European Pat. Off. . | |
| 55-1937 | 1/1980 | Japan . | |
| 100839 | 8/1980 | Japan | 72/422 |
| 128334 | 10/1980 | Japan | 72/420 |
| 59-78725 | 5/1984 | Japan . | |
| 126619 | 5/1988 | Japan | 72/420 |
| 919804 | 4/1982 | U.S.S.R. | 72/422 |
| 2178987 | 2/1987 | United Kingdom . | |

OTHER PUBLICATIONS

German Published Application, No. DE 3,407,445, pub. Sep. 12, 1985, 5 pages of spec. and 2 pages of drawings.
UK Patent Application, No. GB 2,177,676A, pub. Jan. 28, 1987, 3 pp. of spec. and 3 pp. of drawings.

Primary Examiner—Robert L. Spruill
Attorney, Agent, or Firm—Wigman & Cohen

[57] ABSTRACT

A manipulator device for a bending machine includes a pair of elongate die and punch for bending a workpiece. A first manipulator has a first clamping device for clamping the workpiece to be bent, a first support for supporting the first clamping device in a rotatable manner around a rotary axis parallel to the longitudinal direction of the punch and die, and a second support for supporting the first support in a movable manner in a X-axis direction parallel to the longitudinal direction of the punch and die, in a Y-axis direction perpendicular to the X-axis direction, and in a Z-axis direction parallel to the vertical direction. A second manipulator has a second clamping device for clamping the workpiece, an arm for supporting the second clamping device, and a column for supporting the arm in a rotatable manner around a rotary axis parallel to the Y-axis, the column being so constructed as to be movable toward and away from the first manipulator.

13 Claims, 15 Drawing Sheets

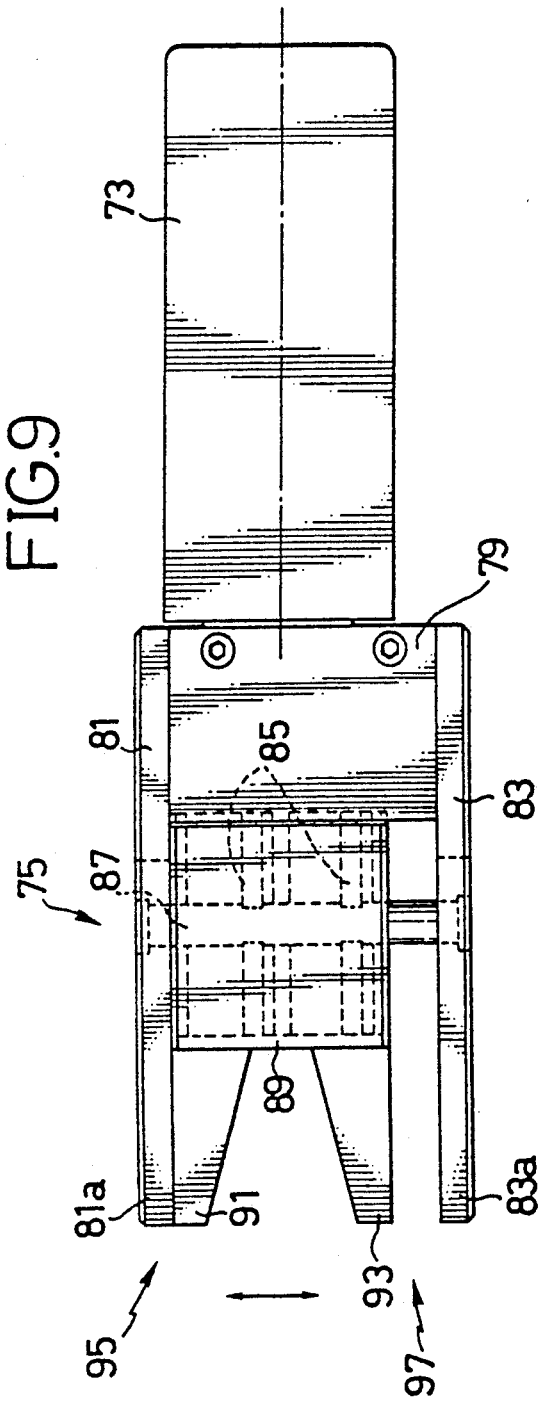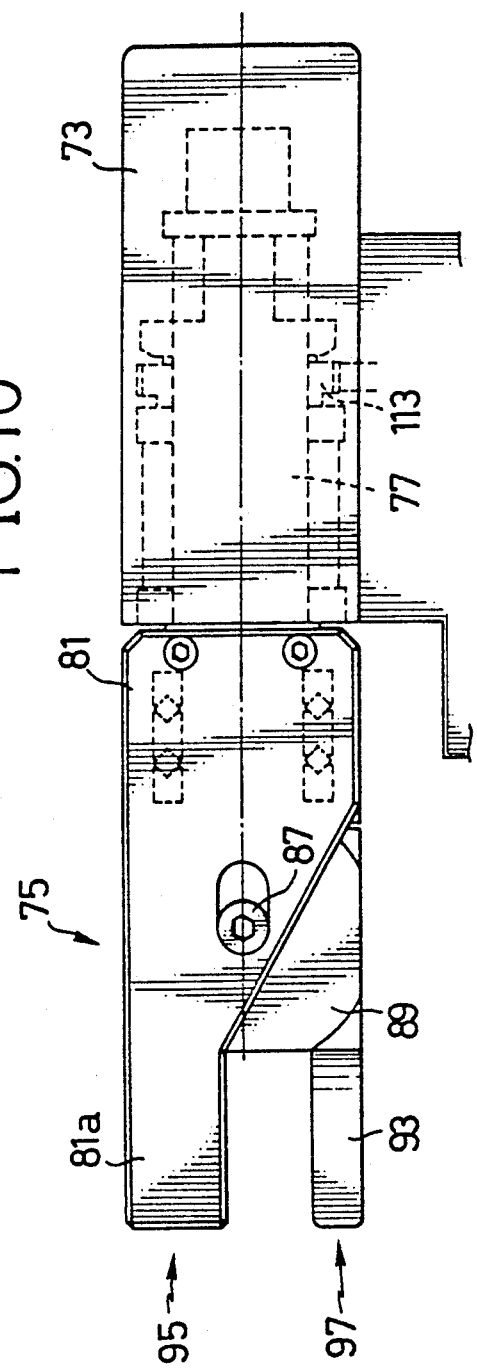

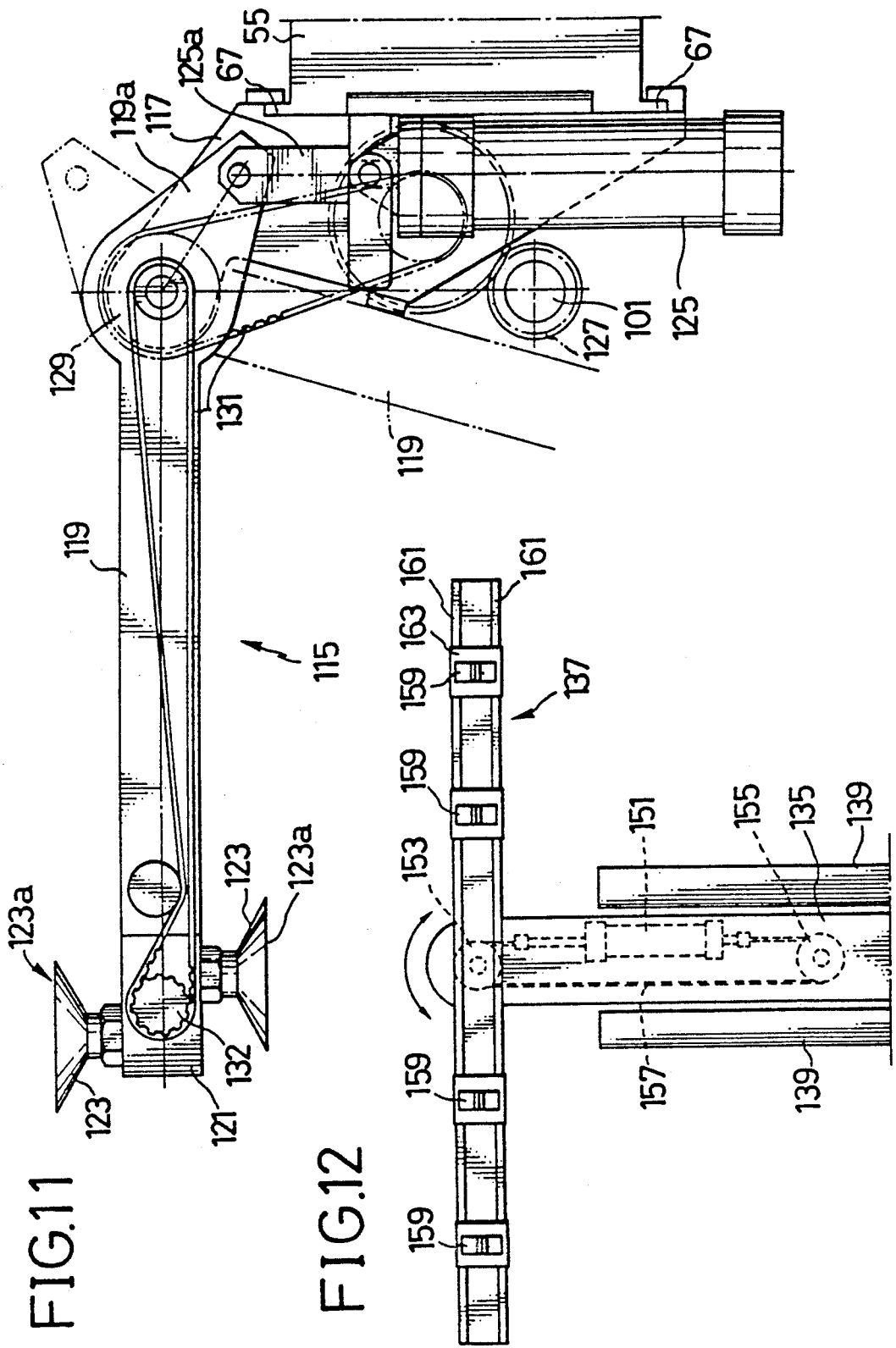

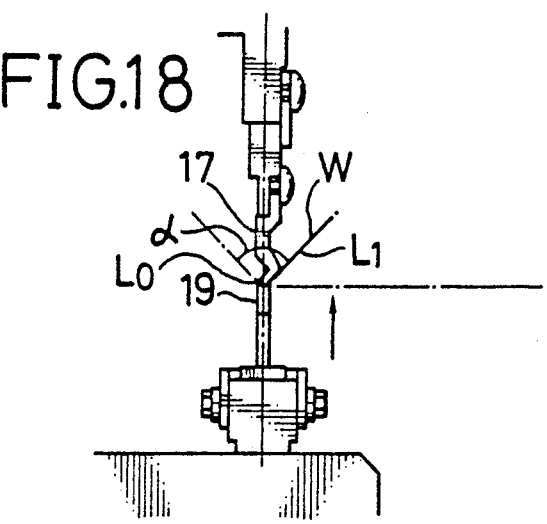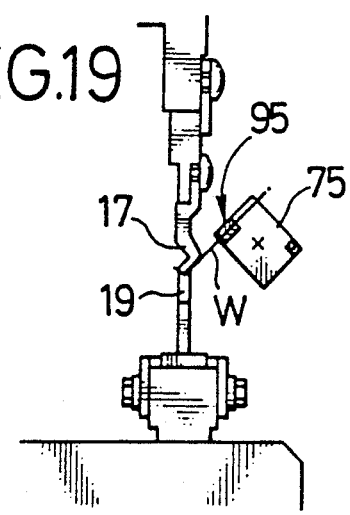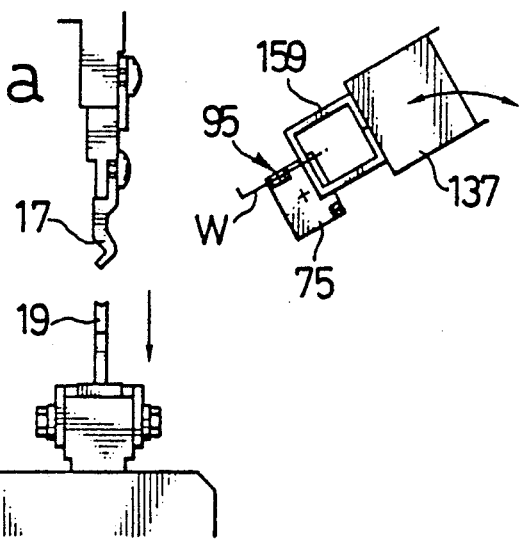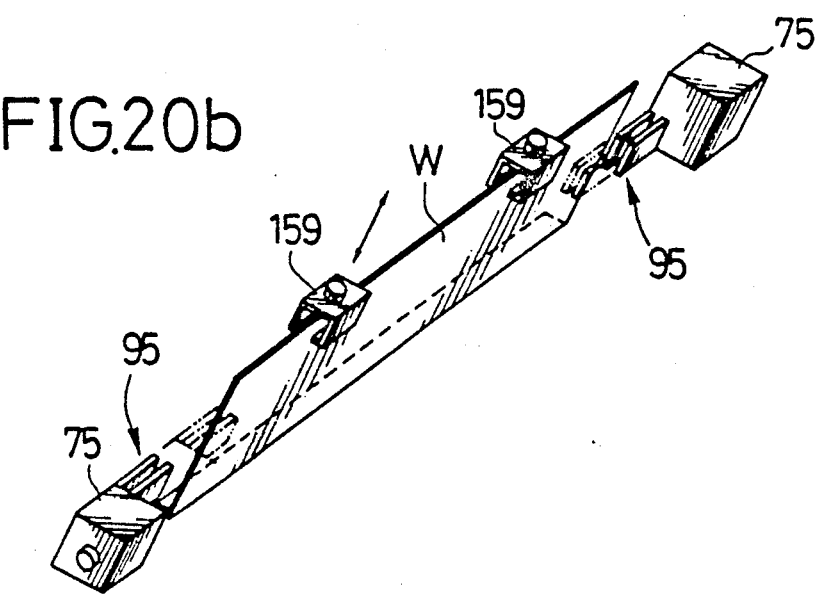

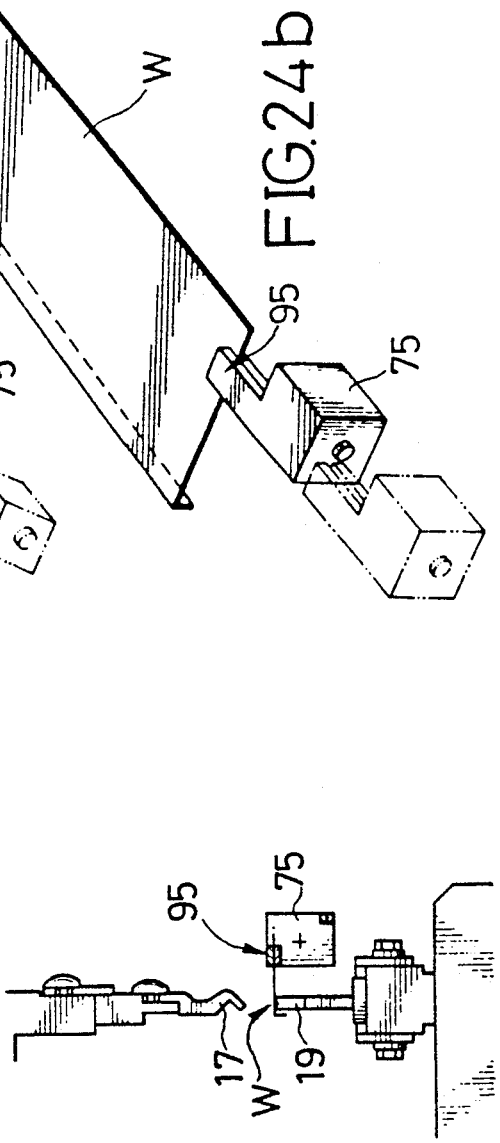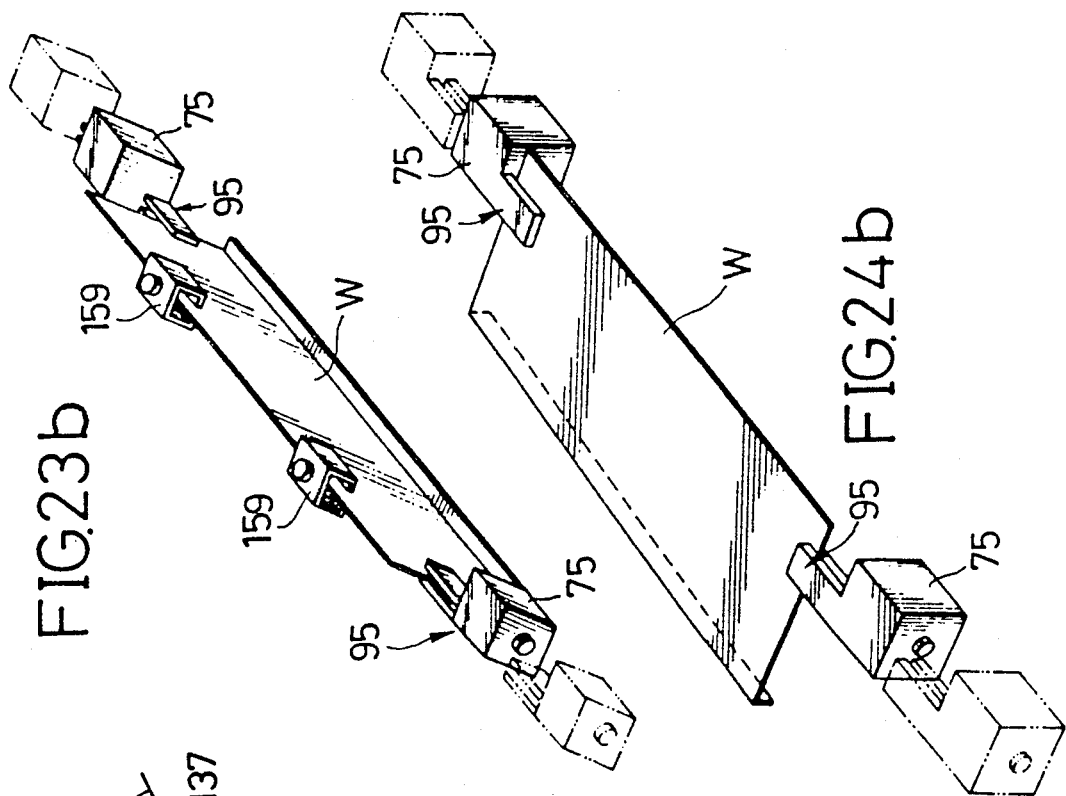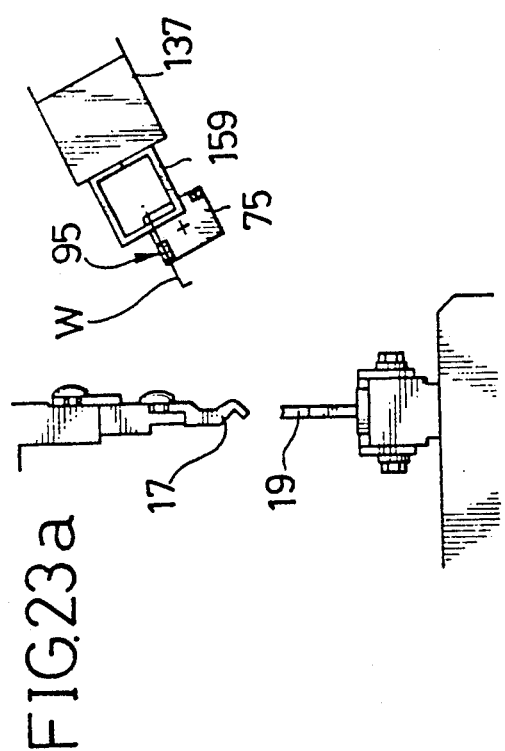

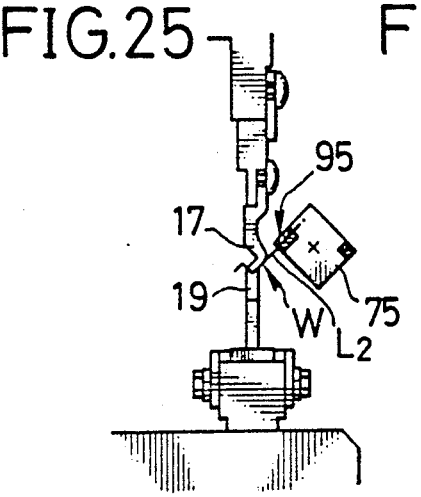 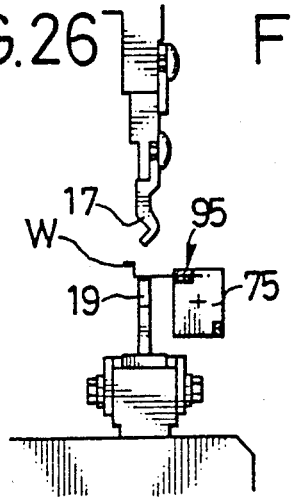 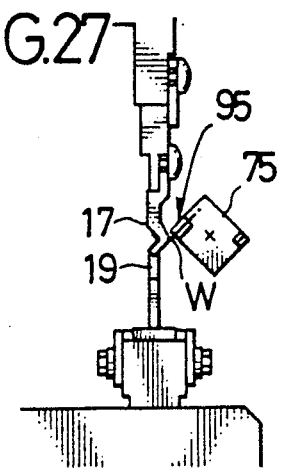
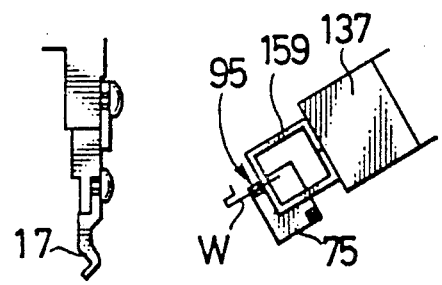
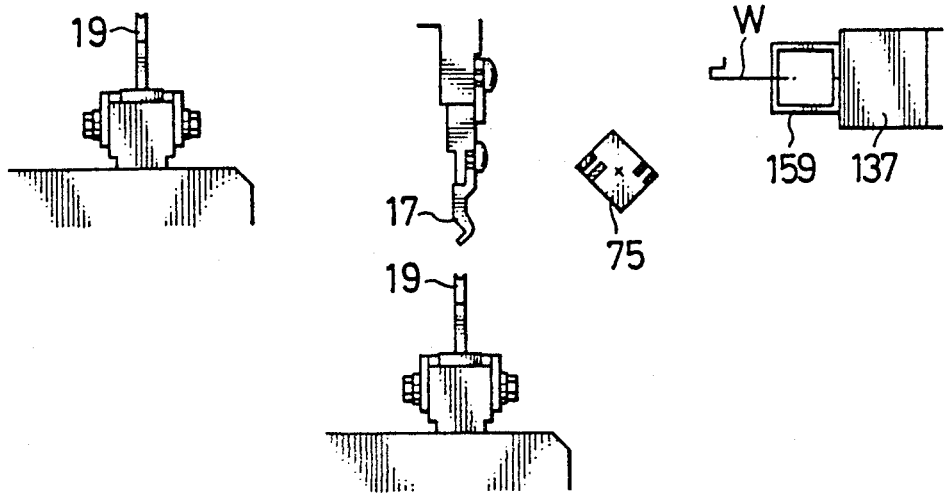

MANIPULATOR DEVICE FOR A BENDING MACHINE AND A METHOD FOR CHANGING THE POSITION OF THE WORKPIECE IN A BENDING PROCESS

BACKGROUND OF THE INVENTION

1. Field of the Invention

The present invention relates to a device for the manipulation of workpieces for a bending press which includes a cooperating die and punch.

2. Description of Prior Art

Bending presses which include horizontally elongate dies and punches, one of which is movable vertically relative to the other, are widespread.

A very simple bending press includes a lower movable die and an upper fixed punch against which the die is thrust in order to bend pieces of sheet metal through a particular angle. The bend may have a sharp edge or a curved-line, undulating-line, broken-line or mixed-line profile. Most commonly, however, the die and the punch form a dihedral normally for forming right-angled bonds. They are used to make a succession of parallel bends in a workpiece of sheet metal which is usually rectangular, so as to finish up with a workpiece having a square C-section, a square omega-section or a Greek-key section.

The manipulation of the workpieces in order to make the successive bends is effected manually by two or more operators, with considerable labour costs.

Certain profiles which have bends all in the same sense, such as a square C-section, may in some cases be formed with the same side of the workpiece always being presented to the press. However, after the first bend of the C has been made, the operators sometimes have difficulty in introducing the same side of the workpiece between the die and the punch and are forced to turn the workpiece around horizontally to its other side before making the second bend. This operation requires considerable space in front of the press.

If the profile of the workpiece has bends in opposite senses, there are two solutions which may be adopted in the event that it is not possible to change the die and the punch of a press: the first solution is to use two presses beside each other, one for bending in one sense and the other for bending in the other sense; the second solution consists of using a single press and rotating the workpiece through 180° each time the sense of bending is changed. In this case, the workpiece is sometimes rotated about a longitudinal axis parallel to the bends; sometimes, however, the workpiece is turned "end over end" or rotated about an axis perpendicular to the bends.

The first solution is expensive in that it requires two presses instead of only one. The second solution has rather long manipulation times with the consequent costs, and requires a lot of space, in addition to the fact that the turning over of a large and heavy sheet of metal is a dangerous operation.

SUMMARY OF THE INVENTION

With these problem in mind, therefore, it is the primary object of the present invention to provide a device for the manipulation of workpieces of sheet metal which is particularly suitable for a press intended to make successive bends by means of the same die and the same punch, which can operate automatically without any manual intervention, which is versatile by virtue of the fact that it can be controlled numerically by simple algorithms, and which occupies little space, enabling, among other things, the workpiece to be turned in a small space when successive bends are carried out in opposite senses.

In order to achieve the above-mentioned object, the manipulator device for the bending machine according to the present invention comprises: a first manipulator having, a first clamping means for clamping the workpiece to be bent, a first support means for supporting the first clamping means in a rotatable manner around a rotary axis parallel to the longitudinal direction of the punch and die, and a second support means for supporting the first support means in a movable manner in a X-axis direction parallel to the longitudinal direction of the punch and the die, in a Y-axis direction perpendicular to the X-axis direction, and in a Z-axis direction parallel to the vertical direction; and a second manipulator having, a second clamping means for clamping the workpiece, an arm means for supporting the second clamping means, and a column means for supporting the arm means in a rotatable manner around a rotary axis parallel to the Y-axis, the column means being so constructed as to be movable toward and away from the first manipulator.

Further, the method for changing the position of the workpiece in a bending process is characterized in that when the workpiece is presented, the position of the workpiece is changed by causing the workpiece to rotate within a vertical plane which is perpendicular to the longitudinal direction of the punch and die, at the front of the bending machine.

Throughout the present description and in the claims "bend" means not only a sharp bend but also a transition zone between two portions which are inclined to each other.

Although the invention was conceived for use with a bending press in which a die and a punch are movable one relative to the other in a vertical working plane and in which the workpiece is introduced between the die and the punch in a horizontal loading plane, the invention may be applied regardless of the orientation of these planes in space, as well as of their relative orientation.

As will be better explained below, the invention is based on the recognition of the fact that, after successive bends made by the same die and the same punch, the workpiece which is still gripped between them always has two or more flat portions which are inclined at predictable angles. In order to manipulate the workpiece, it is therefore basically possible to use one or more grips which can grip and release a portion of the workpiece which lies in a plane inclined at a predictable angle to the loading plane. This angle will be zero before the first bend has been formed in an initially flat workpiece.

BRIEF DESCRIPTION OF THE DRAWING

The invention will become clearer from a reading of the detailed description which follows with reference to the appended drawing, given purely by way of non-limiting example, in which:

FIG. 9 is a side elevational view taken on the arrow IX of FIG. 8.

FIG. 10 is a view from above, taken on the arrow X of FIG. 8.

FIG. 11 is a side view partially-sectioned in the plane indicated XI in FIG. 3.

FIG. 12 is a partial front elevational view of the support structure of a second manipulator of the manipulator device.

FIGS. 16, 17, 18, and 19 are similar to FIG. 15a and show subsequent stages of the cycle.

FIG. 20a is another similar drawing in which the second manipulator is also shown schematically.

FIG. 20b is a schematic perspective view of the workpiece, the manipulator heads with their grips and the second manipulator, in the same condition as FIG. 20a.

FIG. 21b is a perspective view similar to FIG. 20b, which corresponds to the stage of FIG. 21a.

FIGS. 22 and 23a are further vertical sections similar to the above, showing another two subsequent stages of the cycle.

FIG. 23b is a perspective view similar to FIG. 20b, which corresponds to the condition of FIG. 23a.

FIG. 24a is a vertical section similar to the above, showing another further stage of the cycle.

FIG. 24b is a perspective view similar to the above, which corresponds to the stage of FIG. 24a.

FIGS. 25 through 33 are further vertical sections similar to the above, showing further stages of the cycle.

DETAILED DESCRIPTION OF THE PREFERRED EMBODIMENTS

Figure 1:
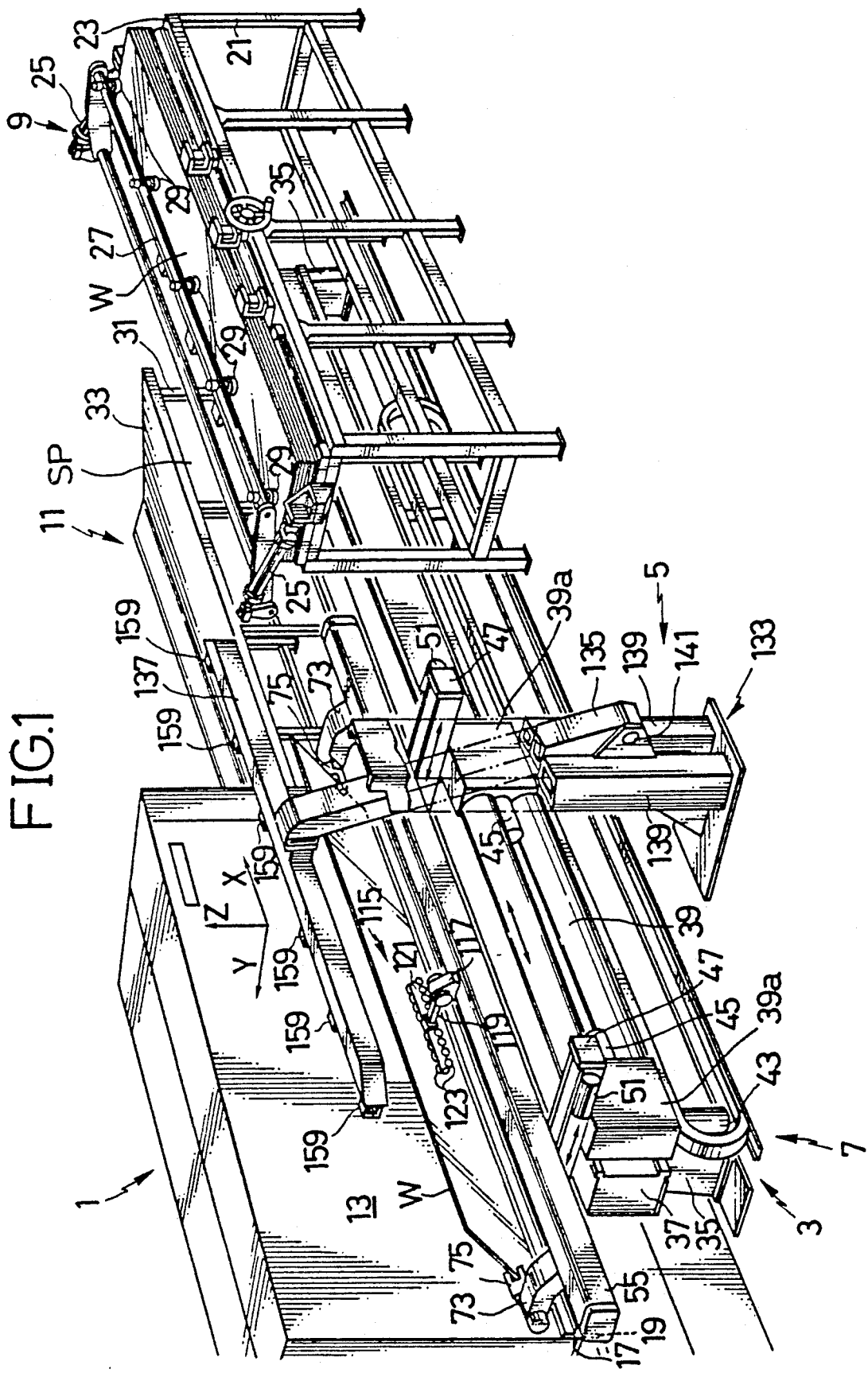
FIG. 1 is a perspective view of a bending press, a manipulator device according to a preferred embodiment of the invention, a loading device, and a table for the unloading of the workpieces.

The preferred embodiment of the invention will now be described, first of all with reference to FIGS. 1, 2, and 3.

A bending press, generally indicated by numeral 1, has a die 19 mounted on a lower frame 15, and a punch 17 mounted on a upper frame 13. In front of the press is a manipulator device according to the invention, generally indicated 7 in FIGS. 1, 2, and 3. The manipulator device comprises a first manipulator 3 and a second manipulator 5.

On one side of the press 1 (on the right in FIGS. 1 and 3) are a loading device 9 and an unloading table, generally indicated by numeral 11.

The loading device 9 includes a bench 21 with a flat top 23 on which rests a pile of rectangular workpieces W to be bent.

A tiltable cross member 27 operated by jacks 25 carries a series of suction cups 29 for picking up successive workpieces W and transporting them to a horizontal position in the space between the loading device 9 and the unloading table 11. The unloading table 11 is constituted by a simple bench 31 with an inclined support plane 33. The plane 33 is intended, as will be seen, to receive the shaped workpieces from the manipulator grips.

The manipulator device 7 according to the invention includes a supporting frame constituted by strong feet 35 which carry a strong guide 37. The guide 37 extends parallel to a working plane (moving plane of the die) of the press 1 along the whole of the lower part of the press, as well as in the space between the loading device 9 and the unloading table 11.

An elongate carriage, generally indicated by numeral 39, is coupled to the guide 37 and is slidable parallel to an axis X which is shown in FIG. 1. The carriage 39 is movable along the guide 37 from a position in front of the press 1 to a position in which it is situated between the loading device 9 and the unloading table 11. The carriage 39 is moved along the guide 37 by a servomotor (not shown) which is preferably numerically controlled. The servomotor drives a gear (not shown) which cooperates with a rack (not shown) which extends along the guide 37.

Near its ends, the carriage 39 supports a pair of strong longitudinal guides 47 which extend parallel to the axis Y which is perpendicular to the axis X. Each of these guides 47 is mounted for vertical sliding on the carriage 39, parallel to the vertical axis Z. They are moved along the axis Z by a numerically-controlled servomotor 45 carried by the carriage 39. Each guide 47 is supported by a strong vertical rod 43 which is slidable in the carriage 39. The servomotor 45 drives in unison respective gears (not shown) which are meshed with respective racks (not shown) supported by the rods 43.

The guides 47 support a strong cross member 55 which extends parallel to the bending zone defined by the die 17 and the punch 19.

Figure 2:
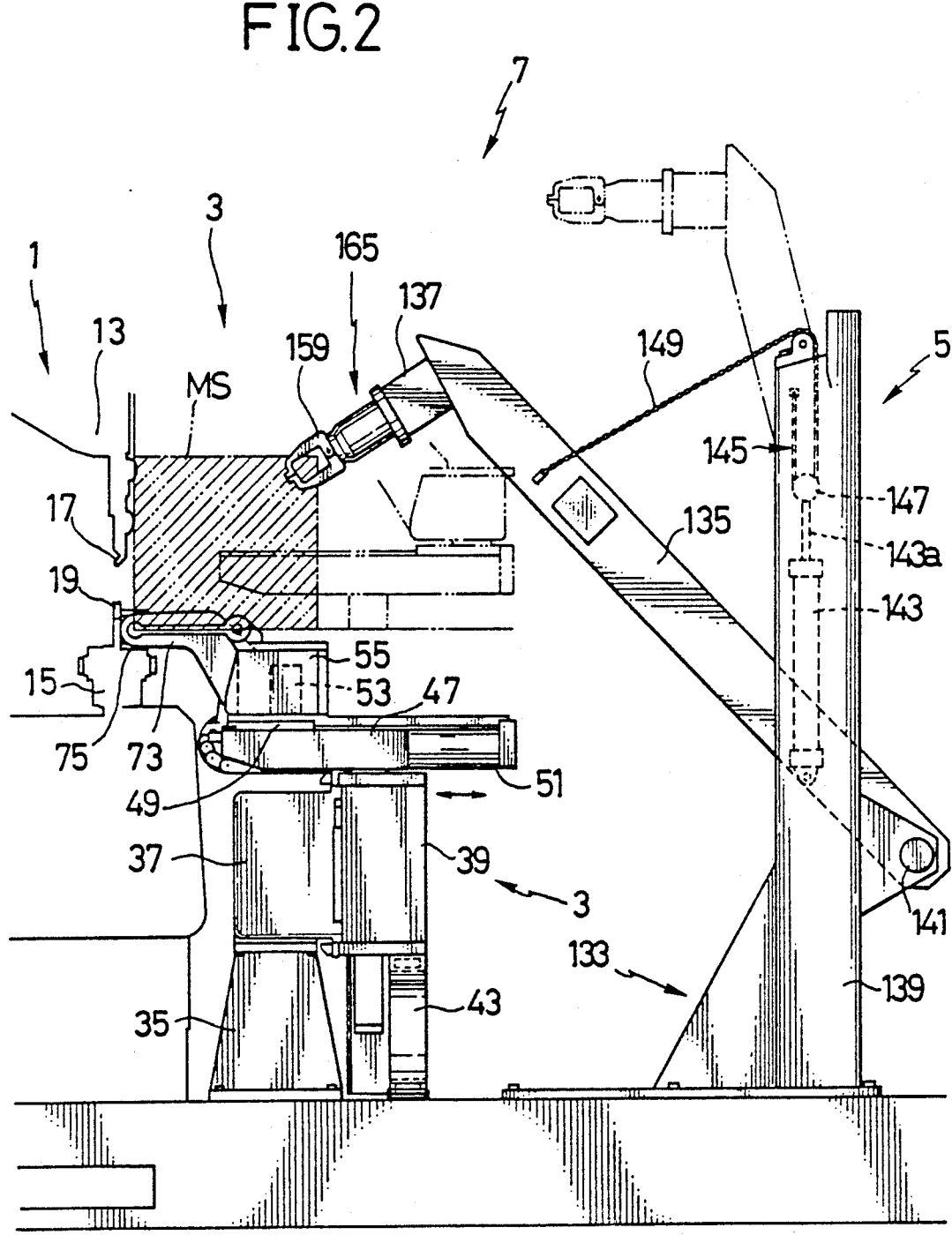
FIG. 2 is a side elevational view of the manipulator device with certain parts shown in different positions.
Figure 3:
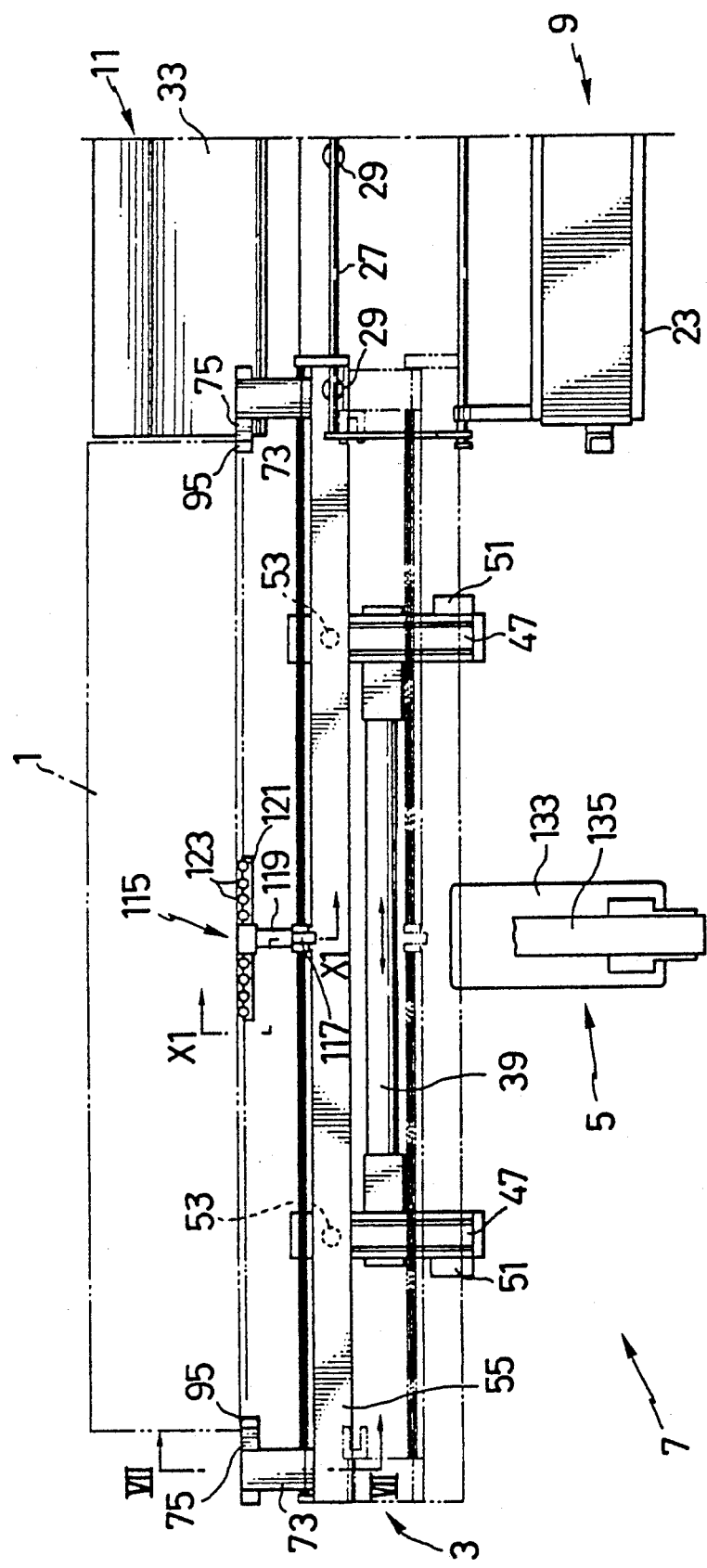
FIG. 3 is a plan view of the manipulator device from above.

The cross member 55 is supported on the guides 47 by respective slides 49 (FIG. 2) which are movable parallel to the axis Y, along the arrow indicated in FIGS. 1, 2, and 3.

For the purpose which will be explained below, each slide 49 carries a vertical pin 53 about which the cross member 55 can pivot horizontally through a small angle.

Each slide 49 is moved by a respective numerically-controlled servomotor 51 carried by the respective guide 47. Each servomotor 51 drives a respective worm screw (not shown) which extends in the guide 47 and cooperates with a female thread (not shown) formed in the respective slide 49.

The cross member 55 is moved along the axis Y during the manipulation of the workpieces W by the two servomotors 51 operating in unison, so that the cross member 55 is moved perpendicular to its longitudinal axis. However, whenever a workpiece W is presented in the bending zone, its edge which bears on the die 19 can be aligned correctly. This serves to correct any errors due to play or imperfections in the mechanism of the manipulator device and of the second manipulator (see below) or to slippage of the workpiece W between the grips. The error can be detected by an backgauge sensor (not shown) mounted on the bending machine 1. The alignment is achieved by the stopping of one of the servomotors 51 and the operation of the other, so as to move the corresponding pin 53 forwards or backwards by a few millimeters in response to a signal from the backguage sensor. The cross member 55 is able to pivot by virtue of its mounting on the pins 53. In practice, the pivoting of the cross member 55 is equivalent to the pivoting of the workpiece W about its vertical center axis parallel to the axis Z.

One of the pins 53 is mounted on a slider (not shown) which is slidable transverse to the direction of sliding of the slide 49. This serves to take up any inaccuracy in the parallel arrangement of the slides 49 and to enable the interaxial spacing of the pins 53 to be varied as a result of the pivoting of the cross member 55 in its plane.

Figure 4:
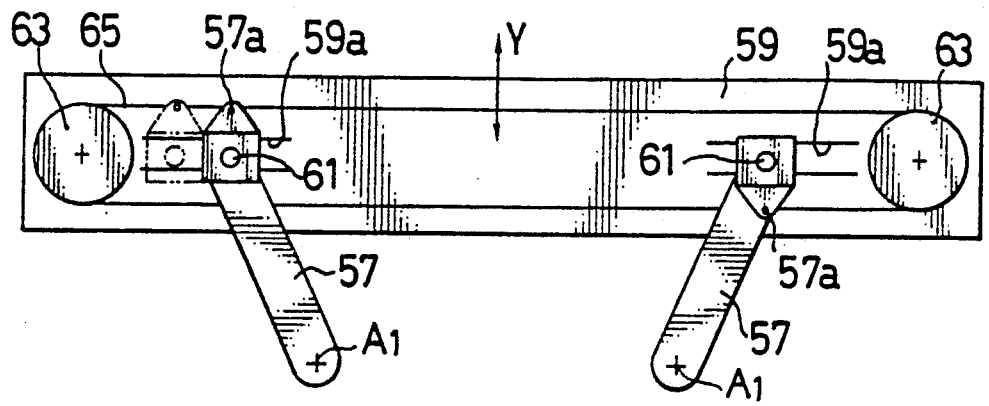
FIG. 4 is a very schematic horizontal section of a detail which shows a variant of a mechanism for the displacement of a cross member of the manipulator device.
Figure 5:
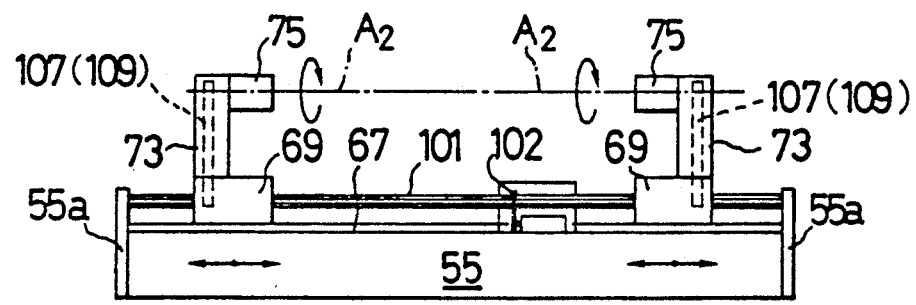
FIG. 5 is a schematic plan view from above of the main part of the manipulator device.
Figure 6:
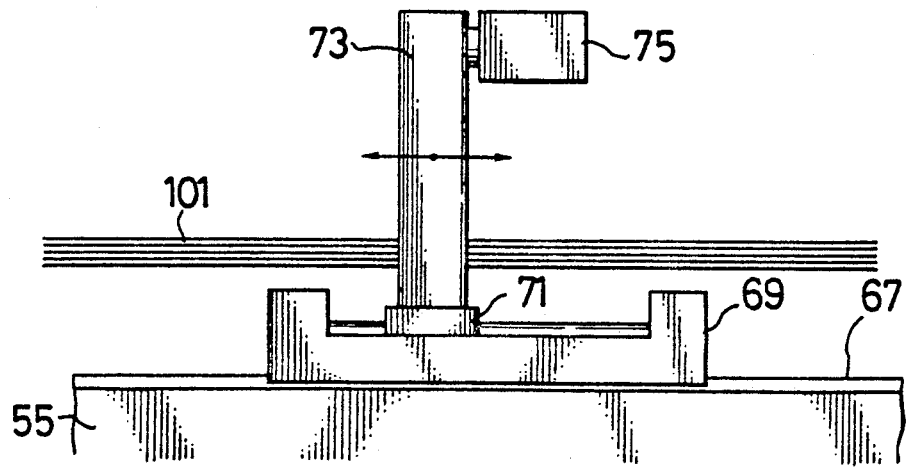
FIG. 6 is a partial schematic plan view from above which further illustrates a part of FIG. 5.

FIG. 4 shows an alternative embodiment of the system for moving the cross member along the axis Y. The cross member, indicated by numeral 59, is supported by a pair of counter-rotating motor-driven cranks 57 arranged symmetrically about the centre of the cross member. The two cranks 57 are rotatable about respective vertical axes A1 and are operated by respective numerically-controlled servomotors (not shown). Each of these has a crank pin 61 engaged with a link coupling in a respective longitudinal guide 59a of the cross member 59. When the two servomotors operate he cranks 57 in unison, the cross member 59 is made to move forwards and backwards perpendicular to its longitudinal axis. In order to align the edge of the workpiece with the bending line or zone, one of the servomotors may be operated whilst the other is stopped.

The embodiment of FIG. 4 has the advantage of being less bulky than the guides 47 in the direction of the axis Y. However, a more complex algorithm is required for the numerical control of its movements along the axis Y.

Preferably, in the cross member 59, there is a chain 65 or toothed belt returned by two idle wheels 63 and anchored at 57a to the crank pins 61. This arrangement ensures that the centre of the cross member 59 always coincides with the mid-point between the crank pins 61. Thus, if the cranks 57 rotate symmetrically, the cross member 59 moves forwards and backwards along Y without moving along X.

With reference now to FIGS. 1, 2, 3, 5, 6, and 7, the cross member 55 carries a pair of horizontal longitudinal guides 67 on its side facing towards the press 1. Two carriages 69 are mounted on these guides 67. These can be moved manually in a symmetrical manner by means of a single chain drive (not shown) operable from the outside of the cross member 55, and can be clamped to the guides 67 in the required positions. Each carriage 69 carries a respective motor-driven slide 71 which is movable reciprocally along the axis X, as indicated by the arrow in FIG. 6. Each slide 71 is moved by a respective actuator, for example, a pneumatic cylinder (not shown).

Each slide 71 carries a strong hollow cantilever arm 73 directed towards the bending press 1. Each of these arms 73 carries one of manipulator heads 75 as a first clamping means, at its free end, the axis of rotation of which is indicated by A2 and is common to the two heads 75.

As will be understood, the movements of the two slides 71 along the axis X serve to cause the engagement and the disengagement of the manipulator grips with a workpeice and their disengagement therefrom, as will be seen later. The fact that the positions of the carriages 69 can be adjusted enables the distance between the manipulator heads 75 to be adapted in dependence on the length of the workpieces W.

The sliding of the carriage 69 and the cross member 55 as a whole in the direction X, however, enables the manipulator heads 75 to pick up a workpiece in front of the loading device 9 and carry it to the front of the press 1 and to transport a shaped workpiece from the press 1 to the unloading table 11.

Figure 7:
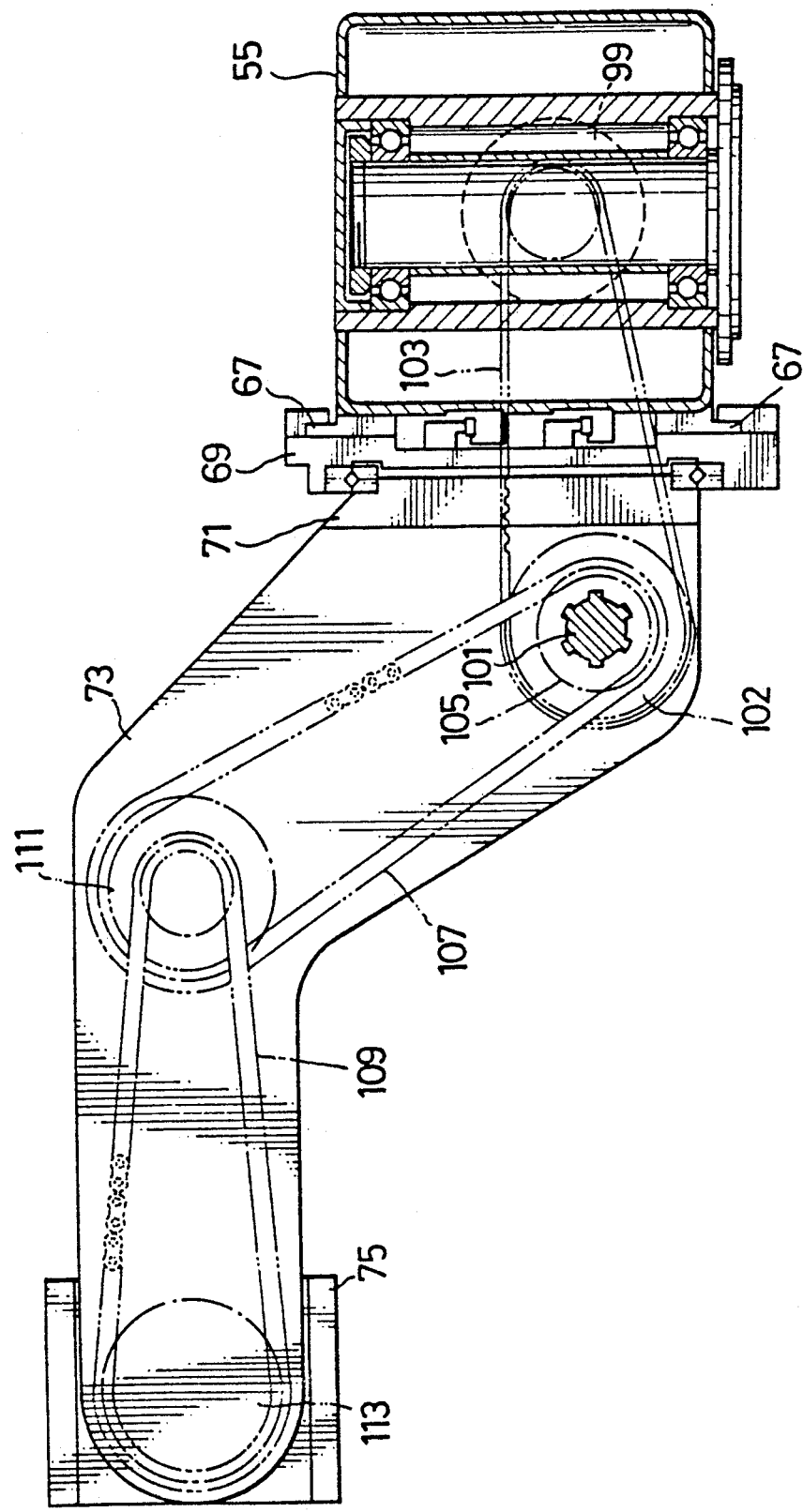
FIG. 7 is a side view of a detail, partially sectioned on the line VII—VII of FIG. 3.

The two heads 75 are rotated in unison about the axis A2, in order both to change their attitude and to change manipulator grips, which will be explained later, by a numerically-controlled servomotor, schematically indicated 99 in FIG. 7. A splined shaft 101 extends along the whole of the cross member 55 and is driven by the servomotor 99 through a toothed belt transmission, indicated by 103 in FIG. 7, and a chain wheel 102 shown in FIGS. 5 and 7.

A driving chain wheel 105 is slidably keyed to the splined shaft 101 within each arm 73. This driving wheel 105 is connected by means of a transmission including two successive chains (or toothed belts) 107, 109 and intermediate wheel 111, to a driven chain wheel 113 which is rotatable about the axis A2 and to which a respective manipulator head 75 is fastened for rotation.

Figure 8:
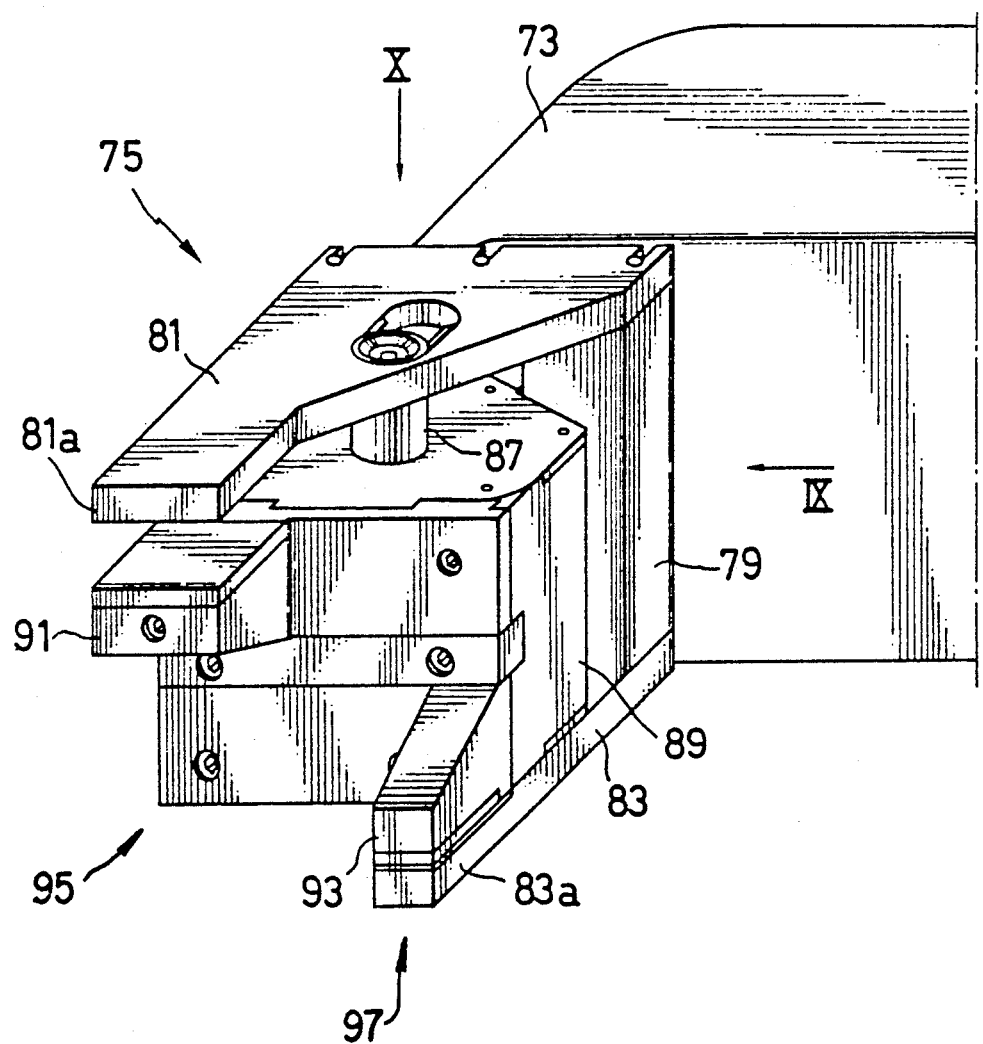
FIG. 8 is a perspective view of a manipulator head of the device.

With reference now to FIGS. 8, 9 and 10 the preferred structure of the two manipulator heads 75 will be described.

In FIG. 10, the driven wheel keyed to the pin or shaft 77 to which the head 75 is fixed is indicated by numeral 113.

The head 75 includes a square flange 79 fixed to the pin 77 and supporting two opposing cantilevered cheeks 81 and 83. The free ends of the checks 81 and 83 are shaped so as to constitute respective outer fixed jaws 81a and 83a of a manipulator grip 95 and a manipulator grip 97 respectively.

A rod 87 extends centrally between the two cheeks 81 and 83 and a double-acting piston 85. The body 89 is movable backwards and forwards along the rod 87, as indicated by an arrow in FIG. 9.

Two movable jaws 91 and 93 are fixed to the body 89, one of which forms part of the manipulator grip 95 and the other part of the manipulator grip 97.

As can be seen, the arrangement is such that the grip 95 is closed when the grip 97 is open, and vice versa.

As can also be seen particularly in FIG. 8, the two diametrically opposed manipulator grips 95 and 97 are situated eccentrically with respect to the axis A2 of rotation of the head 75. The fixed jaws 81a and 83a are situated on the periphery of the head, whilst the movable jaws 91 and 93 are slidable within the periphery of the head. This is the most compact arrangement of the manipulator 75 and enables the manipulator grips 95 and 97 to be as near as possible to the bending zone.

Both the fixed jaws 81a and 83a and the movable jaws 91 and 93 can be replaced simply and rapidly by jaws of different dimensions, particularly of width. Whilst the jaws 83a and 93 shown may be those of the minimum width, the maximum width of the jaws may be equal to the width of the head.

With reference now to FIGS. 1, 3 and particularly FIG. 11, an auxiliary support 115, with which the first manipulator 3 is provided for the manipulation of workpieces of sheet metal W which are very long in the direction of the axis X will be described.

When a workpiece of this type is supported at its ends by the manipulator grips 95 or 97 before bending, or when only a few bonds have been made therein, it is susceptible to sagging and it is therefore necessary to support it in at least one intermediate zone.

For this purpose, at least one auxiliary support device 115, is mounted on the guides 67 of the cross member 55 (see FIG. 11). This device 115 comprises a carriage 117 which is movable manually along the guides 67 and can be clamped thereto in a required position.

In the case of a single auxiliary device 115, this position is the central position of FIGS. 1 and 3.

A hollow cantilovered auxiliary support arm 119 is articulated to the carriage 117 (FIG. 11) about a horizontal axis, parallel to the direction of axis X. When the device 115 is in operation, a jack 125 carried by the carriage 117 keeps the arm 119 in a raised position. At its free end, the arm 119 carries an auxiliary support head 121 constituted by two header tubes, visible in FIGS. 1 and 3.

The head 121 is rotatable about an axis which coincides with the axis A2 of rotation of the manipulator heads 75.

The rotation of the auxiliary head 121 is driven from the same splined shaft 101 by means of a transmission (FIG. 11) which includes a driving wheel 127 similar to the wheel 105 (FIG. 7), intermediate wheel 129, toothed belts 131, and a driven wheel 132 fixed to the head 121. The transmission ratio is such that the auxiliary head 121 rotates in unison with the manipulator heads 75.

The head 121 carries two series of suction cups 123 which are diagonally opposed like the manipulator grips 95 and 97 and have bearing surfaces 123a which correspond with the gripping planes of the manipulator grips. The suction cups 123 are connected to a vacuum source in a manner not shown.

As will be understood, the suction cups 127 can support a workpiece in an intermediate zone thereof, regardless of the attitude of the surface of the workpiece they are engaging.

In the case of a very long workpiece, the auxiliary support device 115 is used, for example, for the forming of the first bends from a rectangular flat workpiece.

When the auxiliary support is no longer required, the jack 125 is operated so as to make the arm 119 descend to its inactive position shown by two-dot chain line in FIG. 11.

The second manipulator 5 of the manipulator device 7 will now be described.

As shown in FIGS. 1, 2 and 12, a strong columnar support 133 is fixed to the floor at the opposite side of the frame 35 to that facing the press 1 and comprises two box-sectioned uprights 139 side by side. Between the uprights 139 is a strong box-section pivoting column member 135 supported by the uprights 139 by means of a pin 141.

A vertical jack 143 (FIG. 2) is incorporated in one of the uprights 139. A block and tackle 145 is associated with the rod 143a of the jack 143 for a chain 149 fixed to the arm 135 through pulley 147.

Moreover, with reference to FIG. 12, an arm member 137 which carries auxiliary grips 159 as second clamping means is mounted at the free upper end of the column member 135 for rotation through 180° along a double-ended arrow and about an axis parallel to the axis Y. A longitudinal, double-acting pneumatic actuator 151 is incorporated in the arm 135 and rotates the arm member 137 through a chain transmission 153, 155 and 157.

The structure of the column member 135, the arm member 137 and the grips 159 can be made to pivot by means of the jack 143 between the inclined position illustrated in continuous outline in FIG. 2, and the vertical raised position illustrated in broken outline in FIG. 2 for the rotation of the arm member 137 and the workpiece W about the axis parallel to axis X.

In FIG. 2, the cross member 55 and one of the arms 73 for supporting the manipulator heads 75 are shown in continuous outline in the lowest and most advanced position, and are shown in broken outline in the highest and most withdrawn position. The manipulation space in which the common axis A2 of rotation of the manipulator heads 75 (and of the auxiliary support head or heads 115) can be moved is indicated by MS. As can be seen, when the axis A2 is in the highest and most withdrawn position, it is in the gripping zone of the grips 159.

Figure 13:
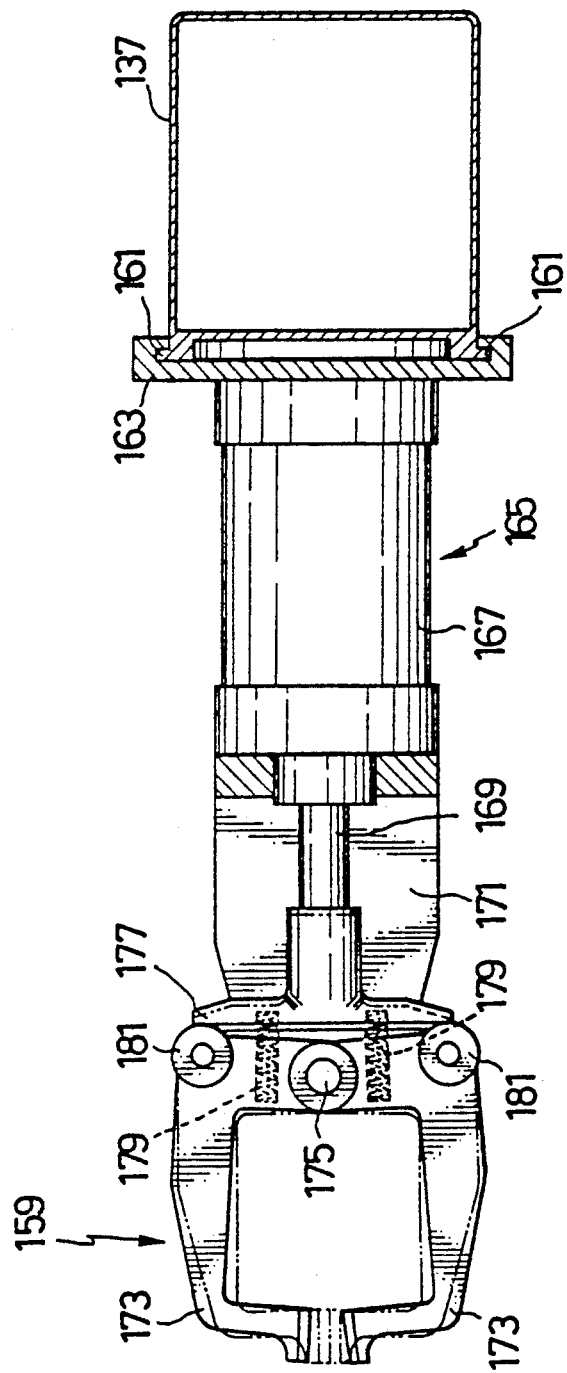
FIG. 13 is a partially-sectioned side view of a part of second manipulator.

With reference to FIGS. 12 and 13, the arm member 137 includes a pair of longitudinal guides 161 along which are mounted several slides 163 that are movable by hand and can be clamped in the guides themselves in the most convenient positions.

As shown in FIG. 13, each slide 163 is fixed to the cylinder 167 of a double-acting pneumatic actuator 165. The rod of the actuator 165, indicated by numeral 169, projects forwardly of the arm member 137.

The cylinder 165 carries a bracket 171 which surrounds the rod 169 and carries a transverse pin 175. The pin 175 constitutes a central fulcrum for two symmetrical jaws 173 of the auxiliary grip 159.

Each jaw 173 is provided with a pair of lateral rollers 181. The rod 169 is provided with an end plate 177 with which the rollers 181 cooperate.

Helical biassing springs 179 are interposed between the plate 177 and each jaw 173 and are fixed to respective cavities or seats in the plate and the jaw.

The arrangement is such that, when the actuator 165 is contracted and the plate 177 is retracted, the springs 179 keep the grip 159 open with the jaws 173 apart, the whole being as shown in continuous outline in FIG. 13.

When the actuator 165 is pressurised, the rod 169 advances and the plate 177 pushes against the rollers 181, forcing the jaws 173 to close. This situation is shown in broken outline in FIG. 13.

The operation of the manipulator device 7 will be explained with reference to FIG. 14 through FIG. 33.

Figure 14:
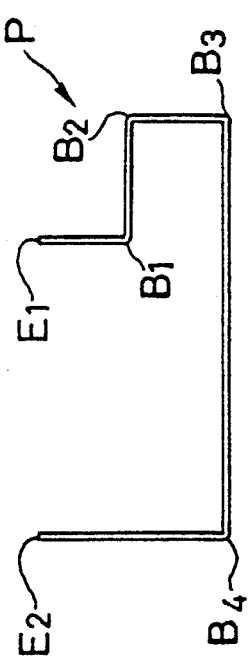
FIG. 14 shows a relatively simple profile into which a workpiece of sheet metal is to be shaped by means of successive right-angled bending operations in bending press provided with the manipulator device.

In FIG. 14, successive bends to be formed sequentially in a workpiece of sheet metal in order to produce the profile illustrated in FIG. 14 are indicated by B1, B2, B3, B4.

FIGS. 15a, 15b through FIG. 33 show a bending process through which the bends B1, B2, B3 and B4 are performed. In the case shown, the punch 17 is fixed whilst the die 19 is movable reciprocally in a vertical working plane indicated by a dashed line in FIG. 15a. The die 19 has a concave dihedral profile and the punch 17 has a complementary convex dihedral profile. In the case shown, the angle of the dihedron is 90° and is symmetrical about the working plane.

Figure 15A:
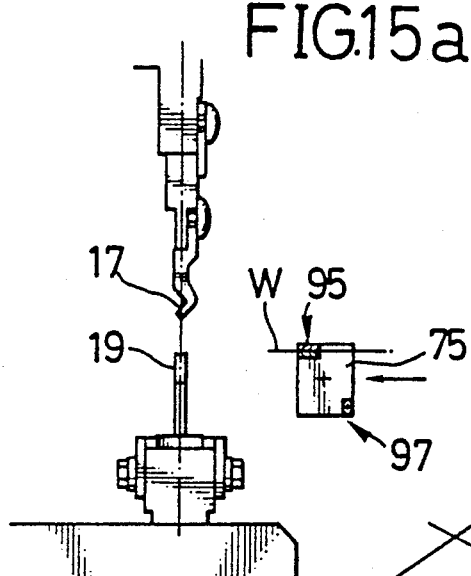
FIG. 15a is a very schematic vertical section of the bending press and of the manipulator device at the beginning of a bending cycle for producing the profile of FIG. 14.
Figure 15B:
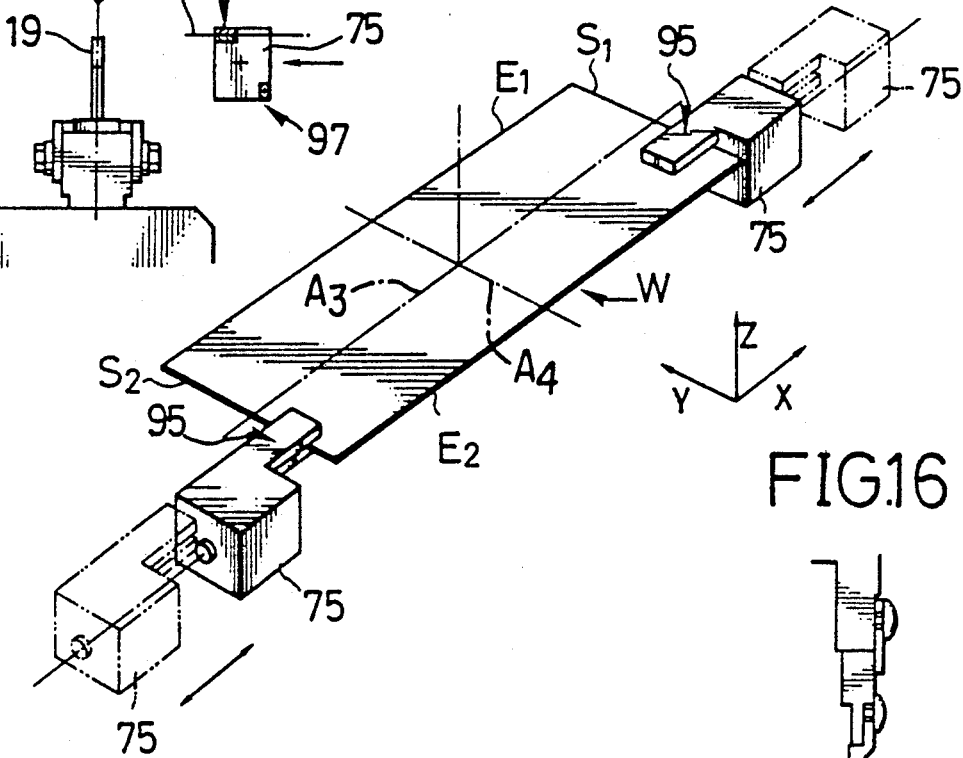
FIG. 15b is a schematic perspective view of the workpiece and of a pair of manipulator heads with respective grips, which are provided on the manipulator device.

In order to produce the workpiece with the profile of FIG. 14, one starts with a flat rectangular workpiece W of sheet metal having a major axis A3 and a minor axis A4 (FIG. 15b).

As explained above, a manipulator device according to the invention comprises the pair of manipulator heads 75 which carry the respective manipulator grips 95. These grips, as shown in FIG. 15b, have gripping mouths which face each other and are movable in unison towards and away from each other, as indicated by arrows. Their direction of the movement is parallel to the bending zone defined by the die 19 and the punch 17.

Each manipulator head 75 is mounted for rotation about an axis A2 which is common to the two heads and parallel to the axis of the movement thereof.

The two heads 75 also carry respective further grips 97 (FIG. 15a) which are situated in positions diametrally oposite the grips 95 and have different dimensions, for the purpose which will be made clear below.

In FIGS. 15a and 15b, a flat part of the workpiece W is gripped by the two grips 95 in edge regions which correspond to the shorter sides or edges S1 and S2 of the workpiece W itself. It is assumed that the workpiece W is placed in the position of FIG. 15a by the grips 95, or that it is placed in that position by some other system.

In FIG. 15a and in the other similar figures, the longer edge or side of the workpiece W, indicated by E1 or E2 in FIG. 15b, is indicated by a dot to provide a reference in order better to explain the manipulations of the workpiece during the cycle.

As explained before, the two heads 75 are movable reciprocally in unison, both horizontally and vertically.

In FIG. 15a, the workpiece W is positioned horizontally at substantially the same level as the upper edges of the die 19, which is lowered. In practice, particularly in the case of long and heavy workpieces, the level of the grips 95 or 97 is slightly higher at the positioning stage to compensate for the bending of the sheet.

Figure 16:
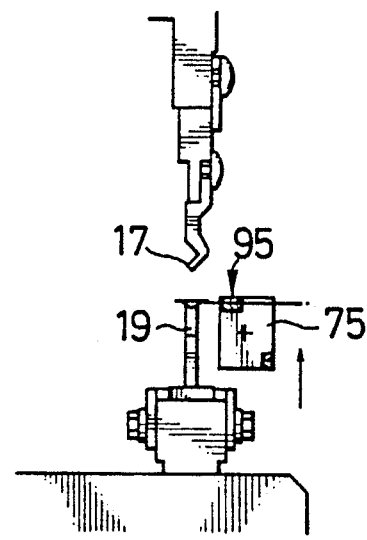

The first stage of the cycle consists of the advance of the heads 75 along an arrow in FIG. 15a, to bring the workpiece W to bear on the die 19, as in FIG. 16.

At the next stage, the die 19 and the heads 75 are made to rise in unison (FIG. 16) until the workpiece W is brought to a position in which the die 19 and the punch 17 are holding it without bending it. This plane is conventionally known as the loading plane and is indicated by LP in FIG. 17.

In the subsequent stage, the two heads 75 and the two manipulator grips 95 are moved apart to release the workpiece W and locate themselves in the positions indicated in broken outline in FIG. 15b.

The next stage is the bending stage in which the die 19 is raised further in FIG. 18 and forms the bend B1 in the workpiece W.

At the end of this bending operation, as can be seen in FIG. 18, two portions L0, L1 which are inclined to each other by an angle (alfa) (in the present case 90°) are formed in the workpiece W.

At the next stage, whilst the workpiece W is still gripped between the die 19 and the punch 17, the heads 75 rise and rotate to assume the attitude of FIG. 19. In this attitude, the manipulator grips 95 have a plane of contact which coincides with the plane of the portion L1 and they can grip the workpiece W again, as shown.

After the workpiece W has been gripped again, the die 19 descends again as shown in FIG. 20a, to the position of FIG. 15a. The heads 75 are made to rise further and moved away from the press to the position shown in FIG. 20a. In this position, there are auxiliary grips 159, shown schematically in FIG. 20b.

In the gripping position of FIG. 20a, these auxiliary grips 159 have their own inclined gripping plane. In order to enable the auxiliary grips 159 to grip the workpiece W, the heads 75 are made to rotate as they move upwards and away, so as to bring the portion L1 into the gripping plane of the auxiliary grips 159. As shown in FIGS. 20a and 20b, the auxiliary grips 159 grip the edge of the workpiece W at its longitudinal edge.

The auxiliary grips 159 are supported by a common arm member 137 for transporting them along an arcuate path as shown by arrow in FIGS. 20a and 20b.

Figure 21A:
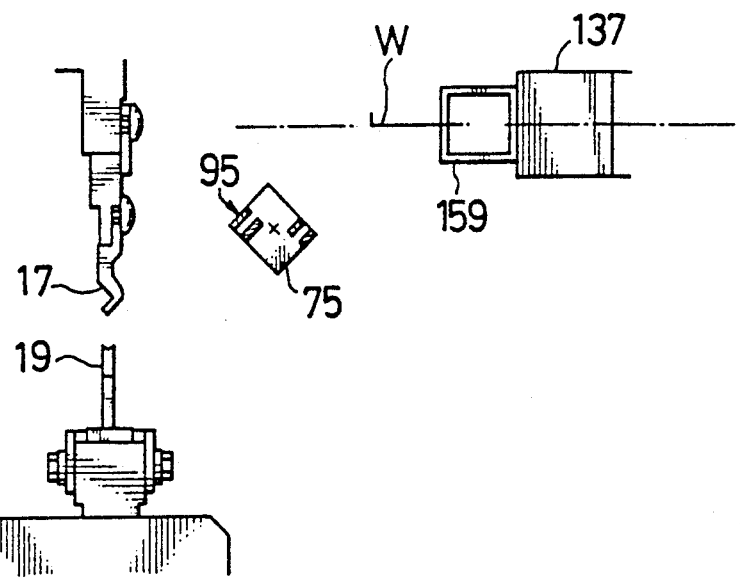
FIG. 21a is a drawing similar to FIG. 20b, at a subsequent stage of the cycle.
Figure 21B:
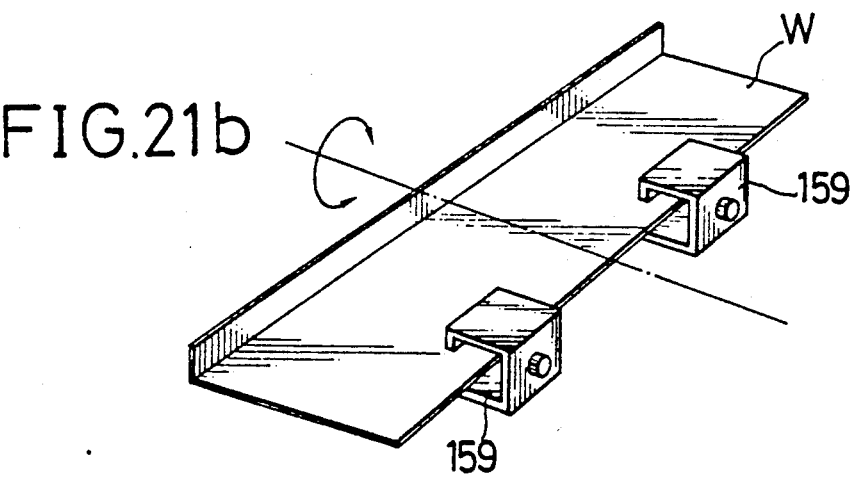

At the next stage, the manipulator grips 95 release the side edges of the workpiece W, as shown in FIG. 20b, and the auxiliary grips 159 move back to the position of FIG. 21a, in which the portion L1 of the workpiece is horizontal.

Figure 22:
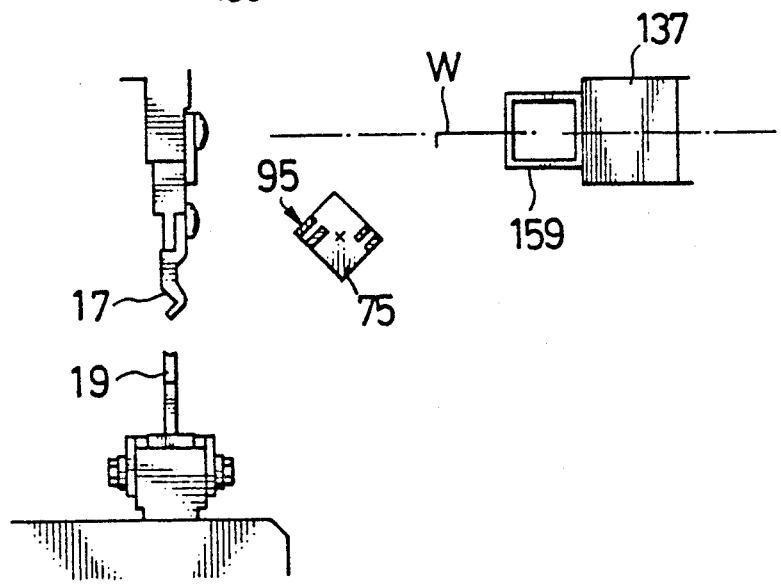
Figure 30:
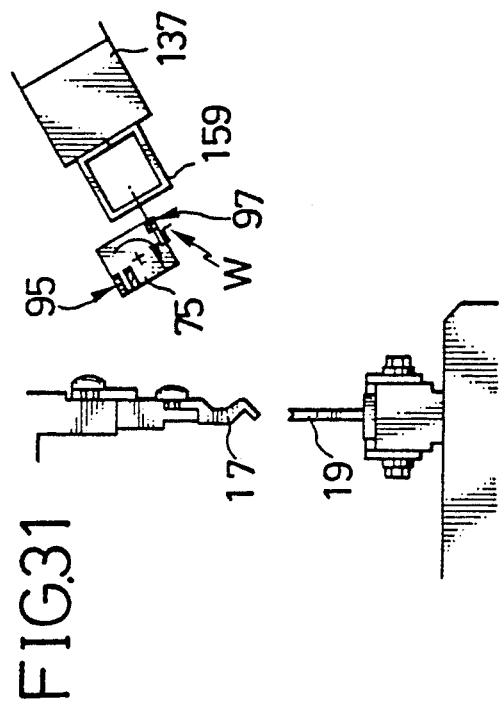

In the subsequent stage, the arm member 137 supporting the grips 159 is made to rotate about an axis parallel to the axis Y. In the condition of FIGS. 21a and 22, the rotation axis is horizontal. Its distance from the floor is such that the workpiece W can be rotated freely about its minor axis A4. Moreover, the workpiece W is kept quite far from the head 75 and the members associated therewith, so as not to interfere with them as it rotates. Nevertheless, by virtue of its rotation about the minor axis A4, the distance of the grips 159 and their supporting apparatus from the bending press is relatively small with an advantageous saving of space.

Once the workpiece W has been turned about the axis A4, it is upside down, as shown in FIG. 22, ready for the forming of the second bend B2.

At the next stage (FIGS. 23a and 23b) the auxiliary grips 159 return to the position of FIG. 20a, the manipulator grips 95 grip the workpiece W again along its portion L1, and the auxiliary grips 159 then move away.

In a further subsequent stage, the two heads 75 descend again, are reoriented with their gripping plane horizontal (FIG. 24a), and advance to bring the portion L1 to bear on the edges of the lowered die 19.

Figure 17:
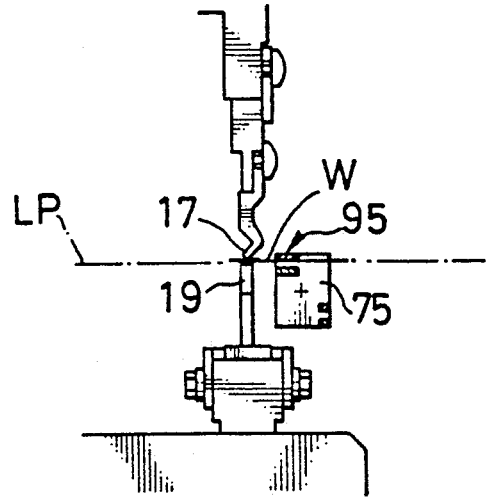

The die 19 then rises to the position corresponding to FIG. 17 (a stage not shown) and the manipulator grips 95 release the workpiece W held between the die and the punch.

At the next stage, the die 19 rises to make the second bend B2 which is in the opposite sense to the bend B1. A portion L2 is thus created, as indicated in FIG. 25.

In the subsequent stage, the heads 75 rise and rotate again to assume the attitude in which the gripping plane of the manipulator grips 95 coincides with the plane of the portion L2. In this condition, the manipulator grips grip the portion L2 in the same way as described with reference to FIG. 19 and in the most convenient region of the shorter sides of the workpiece W.

At the next stage (FIG. 26) the die 19 descends again. The heads 75 also descend again and are reoriented in the attitude in which their gripping plane is horizontal and the portion L2 rests on the edges of the die 19 in the zone in which the third bend B3 is to be formed. As will be noted, since the two bends B2 and B3 are in the same sense, the workpiece W is not turned over this time and the auxiliary grips 159 do not come into operation.

In the subsequent stage (FIG. 27) the die 19 rises again and forms the third bend B3. As can be seen in FIG. 27, after the third bend has been formed, part of the workpiece W is wrapped round the punch 17. This prevents or makes it difficult to release the workpiece W from the punch 17 by a downward movement.

As explained before, the two manipulator heads 75 are movable in unison in a direction parallel to the axis X. By virtue of this capability, the two heads 75 are moved with the workpiece W to one side (perpendicularly to the plane of the paper of FIG. 27) until the workpiece W is removed from the punch 17 from one side thereof.

Thereafter, the two heads 75 are repositioned in front of the press, rise, and move back to give the workpiece to the auxiliary grips 159 (FIG. 28).

Figure 31:
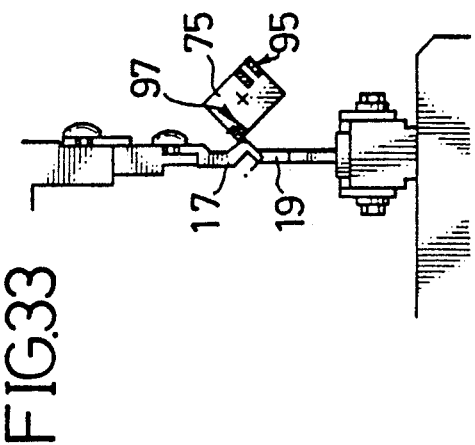
Figure 32:
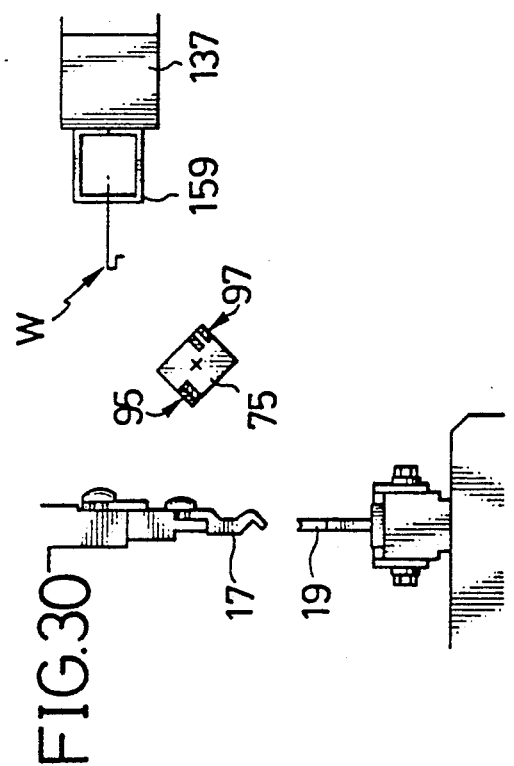

The auxiliary grips 159 then rise (FIG. 29) to turn the workpiece W over (FIG. 30) and return it to the manipulator heas 75 (FIG. 31).

Unlike what is shown in FIG. 25, the auxiliary grips 159 this time give the workpiece to the other manipulator grips 97, which are not so wide as the grips 95. Their narrower width enables the grips 97 to grip the workpiece W in a zone very close to the bends B1, B2, B3 which have already been formed, that is, very far from the fourth bend B4 which will be formed next, as well as quite far from the die and the punch. Moreover, the width 97 may be less since the workpiece W has already been stiffened sufficiently by the bends already made.

At the next stage, the two manipulator heads 75 rotate (FIG. 31) to bring the manipulator grips 97 upwards into the active position.

The grips 97 (FIG. 32) then place the portion of the workpiece W to be bent next, on the edges of the die 19 which rises as before, until the portion of the workpiece W is held without being bent.

Figure 33:
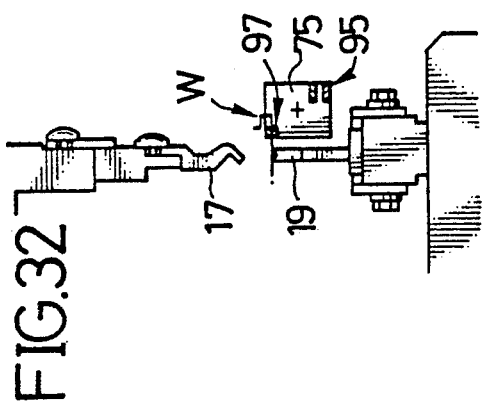

In the last bending stage, after the grips 97 have released the workpiece, the die 19 rises further and forms the fourth bend B4 (FIG. 33). The heads 75 then return to the positions of FIG. 33 and the grips 97 grip the completey shaped workpiece W. As can be seen in FIG. 33, the workpiece surrounds the punch 17 in this case also and is removed by a movement of the heads 75 parallel to their axis X. Upon the completion of the removal, as explained before, the grips 97 release the workpiece which falls onto an unloading table.

Now, some general comments will be added.

The upward and downward and forward and backward movements of the manipulator heads 75 may to advantage be broken down into simple translations along two axes, a horizontal axis Y and a vertical axis Z (FIG. 1). The movements of the manipulator heads 75, both for the gripping and release of the workpiece W and for the removal of the workpiece under conditions such as those of FIGS. 27 and 33, are simple translations along a horizontal axis X. The orientation movements of the heads 75, for the positioning of the manipulator grips 95 or 97 in the various attitudes for the gripping and the release of the workpiece W, for the rotation of the workpiece through 180° about its major axis A3, as well as the movements for the turning around of the manipulator heads 75 to exchange the grips 95, 97, are simple rotations about the axis A2. All this lends itself to a numerical control of the manipulator device by means of very simple algorithms.

In the working cycle described above, it is assumed, for simplicity, that the grips 95, 97 always grip the portion of the workpiece which is nearest to the bend to be formed, but for certain bends the program of the working cycle may provide for the gripping of a portion which is further away.

In order to manipulate workpieces of small dimensions, a single grip could even be used to grip the workpiece at one edge, for example, a longitudinal edge such as that indicated E1 or E2 in FIG. 15b. This solution would lend itself to the manipulation of workpieces in which bends are all to be executed in the same sense. This could also be the case with the use of several manipulator grips. However, the use of grips, such as grips 95 and 97, which grip the workpiece at its end edges or shorter sides seems much more convenient, since the longitudinal edge E1 or E2 (FIG. 15b) is always left free for gripping by the auxiliary grips 159 for the turning over or the movement of the manipulator grips along the shorter sides. Moreover, the lateral arrangement of the manipulator grips 95 and 97 enables these grips to grip the workpiece W in the most convenient zone of the end edges or shorter sides each time, ensurng on the one hand a firm support of the workpiece and on the other hand the location of the operative manipulator grips as near as possible to the working plane without, however, interfering with the die 19 and the punch 17.

A workpiece W (such as shown in FIG. 15b) could also be turned over by means of a rotation through 180° in its plane, that is, about an axis vertical to the plane in FIG. 15b, and a rotation about its major axis A3. This is the type of manipulation which is usually carried out manually. However, even if it were possible with an automatic device, a manipulation of this type does not seem convenient, since their rotation of the workpiece in its plane requires a considerable space in front of the bending machine. Turning over by means of rotation about the minor axis A4 is the more convenient from this point of views.

In the embodiment shown in FIGS. 1, 2 and 3, the strong guide 37 may be mounted on the lower frame 15 in stead of being mounted on the strong feet 35. In this arrangement, the manipulator heads 75 are always moved in vertical direction in response to the vertical movement of the die 19, since both the die 19 and the manipulator heads 75 are mounted on the lower frame 15. And, the control of the vertical movement of the manipulator head can be simplified.

Also, the following arrangement may be adopted in stead of the above-disclosed one including vertical rod 43, longitudinal guide 47, slide 49 so as to move the cross member 55 in the Y- and the Z-axis direction: a Y-axis guide member which extends in Y-axis direction, may be fixed to the elongate carriage 39 of aforementioned embodiment to support a slide member movably in Y-axis direction; and on the slide member an elevatable member may be supported movably in Z-axis direction to support the cross member 55 of aforementioned embodiment.

Although the invention has been described in its preferred embodiments, it is to be understood that various changes and modifications may be made within the purview of the appended claims without departing from the true scope and spirit of the invention in its broader aspects.

What is claimed is:

1. A manipulator device for a bending machine which includes an elongate die and punch set for bending a workpiece comprising:
   a first manipulator having,
   a first clamping means for clamping the workpiece to be bent,
   a first support means for supporting the first clamping means in a rotatable manner around a rotary axis parallel to the longitudinal direction of the punch and die, and
   a second support means for supporting the first support means in a movable manner in a X-axis direction parallel to the longitudinal direction of the punch and the die, in a Y-axis direction perpendicular to the X-axis direction, and in a Z-axis direction parallel to the vertical direction; and
   a second manipulator having,
   a second clamping means for clamping the workpiece,
   an arm means for supporting the second clamping means, and
   a column means for supporting the arm means in a rotatable manner around a rotary axis parallel to the Y-axis, the column means being so constructed as to be movable toward and away from the first manipulator.

2. The manipulator device for a bending machine of claim 1, wherein the second support means further comprises
   an X-axis guide means which is extended in the X-axis direction when used by the bending machine;
   a first moving means supported on the X-axis guide means in a manner which allows free movement in the X-axis direction;
   a second moving means which is supported on the first moving means in a freely movable manner in the vertical direction of the Z-axis and is provided with a Y-axis guide means for supporting the first support means in a freely movable manner in the Y-axis direction.

3. The manipulator device for a bending machine of claim 2, wherein a length of the X-axis guide member is greater than the width in the X-axis direction of the bending machine, and the first moving means is constructed so that it can move from the front position of the workpiece bending machine to a side position thereof along the X-axis guide member.

4. The manipulator device for a bending machine of claim 2, wherein the first support means is provided with a cross member which extends in the X-axis direction, and the first workpiece clamping means comprises a pair of manipulator heads provided on the two ends of the cross member.

5. The manipulator device for a bending machine of claim 4, wherein said ends of the cross member comprise a right end section and a left end section, wherein a right and a left bracket member which project toward the bending machine are provided on the right and left end sections of the cross member respectively, and the manipulator heads are so provided on the bracket members to face each other.

6. The manipulator device for a bending machine of claim 5, wherein the pair of left and right bracket members are provided on the cross member in a freely movable manner therealong.

7. The manipulator device for a bending machine of claim 6, having front and rear side sections, wherein each of the manipulator heads comprise:
   a pair of fixed jaws positioned in mutual opposition in a specified space;
   a movable body positioned between the fixed jaws in the manner which allows free movement between the fixed jaws; and
   a pair of movable jaws secured on the front and rear side sections with respect to the movement of the movable body, and which are capable of forming a clamping state with each of the fixed jaws when the movable body moves toward the side of either of the fixed jaws.

8. The manipulator device for a bending machine of claim 7, wherein clamping surfaces of the two pairs of jaws formed from a fixed jaw and a movable jaw are different in width.

9. The manipulator device for a bending machine of claim 8, wherein the manipulator head is provided on the bracket member in a freely rotating manner about an axis parallel to the longitudinal direction of the cross member.

10. The manipulator device for a bending machine of claim 9, wherein the pair of manipulator head are formed so that they are simultaneously rotated through a spline shaft provided along the cross member.

11. The manipulator device for a bending machine of claim 4, wherein an auxiliary support member for the workpiece is provided close to the center of the cross member to support the workpiece.

12. The manipulator device for a bending machine of claim 1, a base means installed on the opposite side of the bending machine from the first manipulator is provided, and a bottom end section of the column means is supported on the base means in a freely swinging manner in the Y-axis direction.

13. A method of automatically changing orientation of a workpiece with respect to a bending machine for bending the workpiece in order to perform bendings on opposite longitudinal edges and in opposite directions in the workpiece to form a processed workpiece, comprising the steps of:
   placing the workpiece in front of the bending machine with a longitudinal edge of said workpiece disposed parallel to a horizontal bending axis of the bending machine;
   clamping the workpiece along the opposite longitudinal edge thereof by means of a clamping means;
   rotating the clamping means and the workpiece gripped thereby about a horizontal axis perpendicular to the bending axis of the bending machine;
   moving the clamping means toward the bending machine in order to transfer the workpiece to another clamping means;
   moving the other clamping means in the vertical direction and toward the clamping means in order to receive the workpiece from the clamping means;
   clamping the workpiece by means of the other clamping means along a shorter edge of the workpiece;
   rotating the other clamping means and the workpiece gripped thereby about a horizontal axis parallel to the bending axis of the bending machine; and
   moving the other clamping means and the gripped workpiece in the direction parallel to the bending axis in order to unload the processed workpiece.

* * * * *